United States Patent [19]

Takahashi et al.

[11] 4,425,701

[45] Jan. 17, 1984

[54] METHODS OF MAKING MAGNETIC RECORDING HEADS

[75] Inventors: Ken Takahashi, Suita; Hiroshi Youda, Hirakata, both of Japan

[73] Assignee: Matsushita Electric Industrial Co., Ltd., Kadoma, Japan

[21] Appl. No.: 310,114

[22] Filed: Oct. 9, 1981

[30] Foreign Application Priority Data

Oct. 17, 1980 [JP] Japan .................. 55-146188
May 20, 1981 [JP] Japan .................. 56-77218

[51] Int. Cl.³ .............................................. G11B 5/42
[52] U.S. Cl. ........................................ 29/603; 360/121
[58] Field of Search ............... 29/603; 360/119, 120, 360/121, 125, 127

[56] References Cited

U.S. PATENT DOCUMENTS

| 3,514,851 | 6/1970 | Perkins et al. | 29/603 |
| 3,593,414 | 7/1971 | Beun et al. | 29/603 |
| 3,845,550 | 11/1974 | Gooch et al. | 29/603 |
| 4,017,965 | 4/1977 | Brutsch et al. | 29/603 |
| 4,188,247 | 2/1980 | Ridgway et al. | 29/603 X |
| 4,192,985 | 3/1980 | Berghof et al. | 29/603 X |

FOREIGN PATENT DOCUMENTS 54-103334 8/1979 Japan ..................... 29/603

Primary Examiner—Carl E. Hall
Attorney, Agent, or Firm—Cushman, Darby & Cushman

[57] ABSTRACT

A method for making magnetic recording heads suitable for mass production with high accuracy.

The track width tw or w of the head core is defined by a photolithographic etching method.

First, larger grooves are formed by mechanical machining or electrolytic etching to form an outline of the pole piece parts, and then further smaller and shallower grooves are formed with very high accuracy by an etching process, such as electrolytic etching, sputter etching or ion etching at the edges of the first grooves. Thus, the track width of the head core is accurately determined by means of a photolithographic process.

22 Claims, 26 Drawing Figures

FIG. 4 (b')
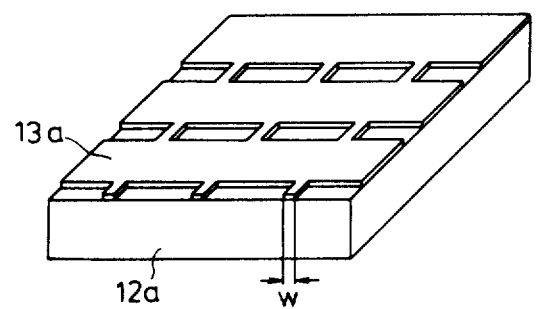
FIG. 4 (d')
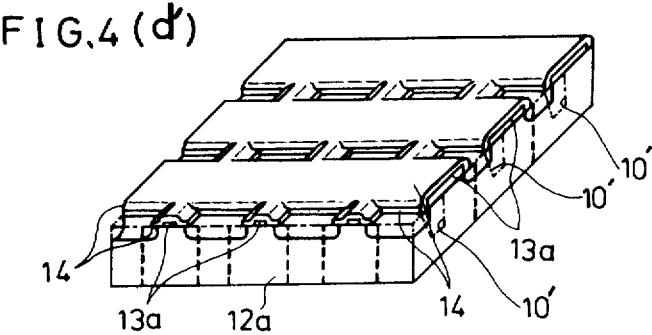

METHODS OF MAKING MAGNETIC RECORDING HEADS

BACKGROUND OF THE INVENTION

1. Field of the Invention

The present invention relates to a novel method of making magnetic recording heads, especially of those for use with a very narrow recording track.

2. Prior Arts

Progress in the technology of magnetic recording in recent years is remarkable; especially in the technology of attaining higher recording density by narrowing recording track width. For example, during the last ten years, the track pitch of a magnetic recording head for video recording has been narrowed by a factor of 10, resulting in heads having a track pitch of under 20 $\mu$m. Corresponding to such narrowing of the track pitch, the tolerance requirements of recording head such as used in a video tape recorder or the like has become particularly strict; for example, $\pm 2$ $\mu$m or higher accuracy is required.

Conventional video tape recorder heads have typically been made by a method which will be hereafter described with reference to FIGS. 1(a), 1(b), 1(c), 1(d) and 2.

First, a pair of ferromagnetic substance core blocks 1 and 1' shown in FIG. 1(a) are prepared. And then, partial grooves 2, 2 . . . are formed; thereon by a known method such as by using a cutter or dicing saw. Grooves 2, 2 . . . define track width.

A non-magnetic substance 3, such as glass, is then filled in the partial grooves 2, 2 . . . as shown by FIG. 1(c), and mirror-grinding is carried out for abutting faces, and subsequently, a gap spacer film 4 is applied at least on one of the abutting faces. Also a winding groove 102 is formed by known cutting or dicing methods on either block 1 or 1'.

Thereafter, the half blocks 1 and 1' are assembled and bonded such that the faces abut together as shown in FIG. 1(d), by means of bonds 5, 5 such as low melting point glass. Then the assembled body is cut into individual units at the dividing faces shown by dotted lines in FIG. 1(d). The magnetic cores of the conventional magnetic head, as shown in plan view in FIG. 2 are manufactured. Then a winding (not shown) is wound through the winding groove 102.

Since the above-mentioned conventional method uses the mechanical step of dicing or grinding to form the partial grooves 2, 2 . . . , the upper limit of the accuracy is limited by that of the mechanical technique. The accuracy of mechanical tooling techniques is considered to have come almost to a practical limit, and therefore, it has been difficult to obtain a dimensional accuracy of $\pm 1$ $\mu$m. And such dimensional limit has determined accuracy limit of the conventional method. If the accuracy limit is intended to be obtained in such method, extremely strict controls of temperature, moisture, and so on are required, and such is not practical in actual mass production level.

As a result of the above-mentioned circumstance, photolithographic etching methods have recently begun to be utilized in manufacturing narrow track pitch magnetic recording heads. However, conventional photolithographic etching methods are not sufficient, and it is not yet easy to attain both accuracy and deep engraving at the same time. Further, it is still very difficult to attain $\pm 1$ $\mu$m accuracy, using the photolithographic etching done.

SUMMARY OF THE INVENTION

The present invention provides a novel method capable of manufacturing high precision magnetic recording heads for very a narrow track width with a high production yield.

BRIEF EXPLANATION OF THE DRAWING

FIG. 4(b') is a perspective view showing the step of FIG. 4(b).

FIG. 4(d') is a perspective view showing the step of FIG. 4(d).

DESCRIPTION OF PREFERRED EMBODIMENTS

Figure 1:
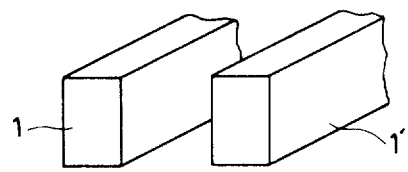
FIG. 1(a), FIG. 1(b), FIG. 1(c) and FIG. 1(d) are perspective views showing steps of the conventional method of manufacturing magnetic recording head cores.
Figure 1:
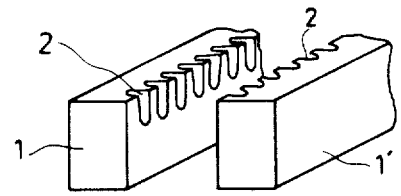
Figure 1:
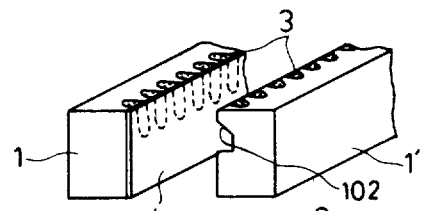
Figure 1:
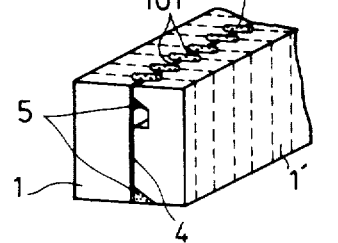
Figure 2:
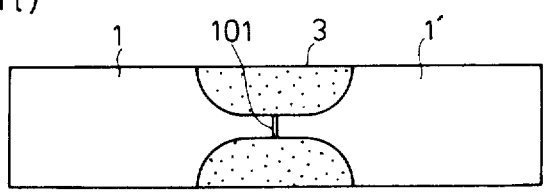
FIG. 2 is a plan view of the magnetic recording head core made in accordance with the conventional manufacturing method of FIG. 1.

The method of making magnetic recording head in accordance with the present invention comprises:
- a step of forming first grooves on a face of a ferromagnetic substance substrate disposed spaced apart substantially parallel each other at a distance wider than a desired track width,
- a subsequent step of photolithographic etching to form second substantially parallel grooves having a depth shallower than that of said the first grooves, disposed parallel to and connecting to said first grooves at the edges thereof, and
- cutting the ferromagnetic substrate into predetermined units and assembling a core by utilizing at least one of said the units.

A first example is described referring to FIGS. 3(a) to 3(f).

At first, parallel grooves 7, 7 . . . are formed by a mechanical technique such as dicing or the like on a principal face 61, which is to become gap face, of a ferromagnetic substance substrate 6, such as Mn-Zn ferrite, of the size, for example, 25 mm square and 1 mm thickness. The grooves 7, 7 . . . are formed spaced apart, with the distance G inbetween which is larger than the size of the desired track width. For example, when the track width is 20 μm, the space G between the neighboring edges of two groove is selected 30 μm, and the depth of the grooves 7, 7 . . . are about 200 μm. Then the grooves 7, 7 . . . are filled wit non-magnetic substance 71 such as glass, as shown in FIG. 3(a), and the principal face 61 is ground and polished to a mirror-smooth face.

Figure 3:
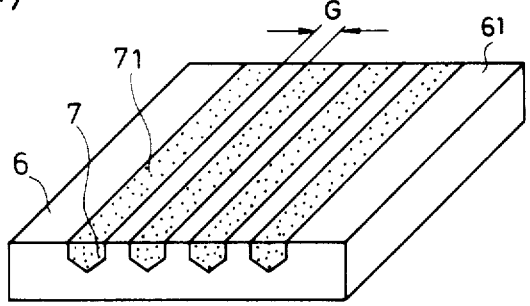
FIG. 3(a) is a perspective view showing a step in a manufacturing method embodying the present invention.
FIG. 3(b) is a perspective view showing a subsequent step in the manufacturing method.
FIG. 3(c) is an enlarged sectional view showing a subsequent step in the manufacturing method.
FIG. 3(d) is a perspective view showing a subsequent step in the manufacturing method.
FIG. 3(e) is a perspective view showing a subsequent step in the manufacturing method.
FIG. 3(f) is a perspective view showing a finished core of the magnetic recording head manufactured by the manufacturing method.
Figure 3:
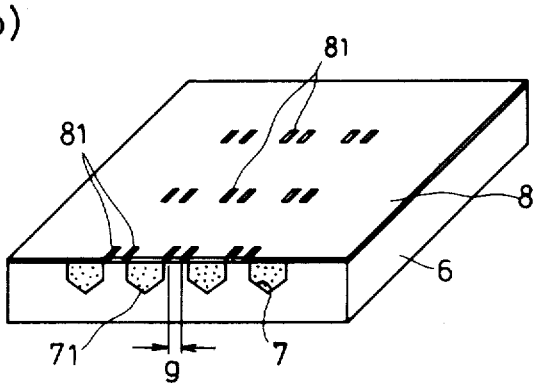
Figure 3:
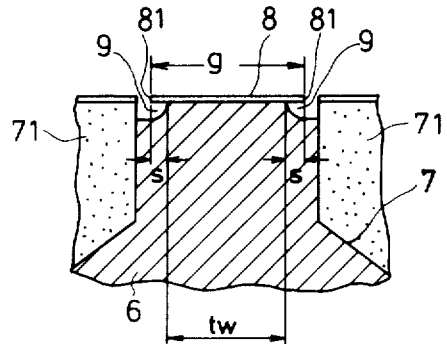

Then, a photoresist mask 8 is formed on the principal face 61, in a manner to have openings 81, 81 . . . for defining track width, as shown by FIG. 3(b). The openings 81, 81 . . . are formed in a manner to retain gap space g inbetween which is larger by an estimated side etch width than the track width tw as shown by FIG. 3(c), and in the example for the track width of tw=20 μm the gap space g is selected 26 μm.

Then, by means of electrolytic etching, the substrate 6 exposed through the openings 81, 81 . . . are etched out, thereby forming track width defining grooves or second grooves 9, 9 . . . of 3 μm depth and side etched by 3 μm under the photoresist mask 8. The etching is made using an etchant containing phosphoric acid, sulfuric acid and glycerine at the ratio of 1:1:1, and applying a DC voltage of 8 V, and an etching rate of 1 μm/min is obtained.

Besides electrolytic etching using a photoresist mask, other etching techniques can be used, such as are ion-etching and sputter-etching using a thin film having a lower sputter rate (rate to be etched by sputtering by argon or the like) than the ferrite, e.g., using a titanium thin film or chromium thin film as the etching mask.

Besides ferrite, known metal-magnetic substances such as Sen-dust can be used and the same electrolytic etching sputter-etching or ion-etching can be applicable thereto attain high accuracy in forming the grooves.

As can be understood from FIG. 3(c), the track width tw is defined by the gap g given by the photoresist mask and the under-cut or side-etch distances. And since the gap g of the photoresist mask 8 and the side-etch distances can be controlled with a high accuracy, a very high accuracy of the track width tw is obtainable.

Figure 3D:
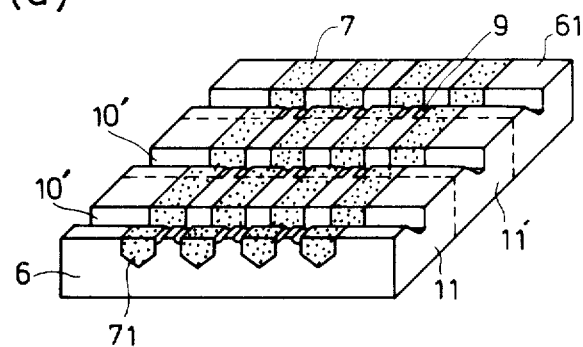

Thereafter, as shown by FIG. 3(d), grooves 10',10' . . . for forming winding holes are formed by mechanical techniques such as dicing on the principal face 61. Then a gap-spacer film, such as thin glass film 17 (not shown) is formed on the principle face 61 by known sputtering methods, and the substrate is cut into rectangle pieces at the cutting faces shown by dotted lines in FIG. 3(d).

Figure 3E:
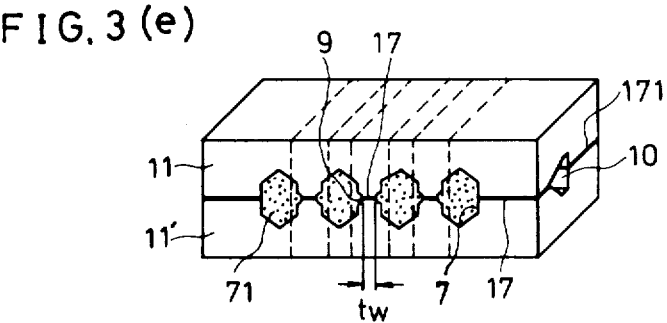
Figure 3F:
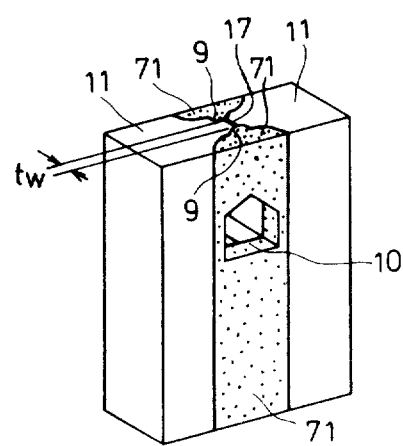

Then, as shown by FIG. 3(e), a pair of the rectangle blocks 11 and 11' are assembled and bonded with their principal faces 61, 61 bonded together, with the gap spacer film 17 inbetween. It is enough that the gap spacer film 17 and the winding hole 10 are to be provided on either rectangle block 11 or 11', or may be formed on both sides. The back gap 171 may be bonded without the gap spacer film. Then the assembled block 11, 11' is cut into pieces at cutting faces shown by the dotted lines in FIG. 3(e), and magnetic core shown in FIG. 3(f) is finished.

A second example in accordance with the present invention is described with reference to FIG. 4(a), FIG. 4(b), FIG. 4(b'), FIG. 4(c), FIG. 4(d), FIG. 4(d') FIG. 4(e), FIG. 4(f), FIG. 4(g) and FIG. 4(h).

Figure 4A:
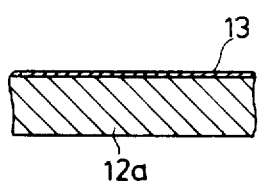
FIG. 4(a) is a sectional elevation view showing a step in another manufacturing method embodying the present invention.
Figure 4B:
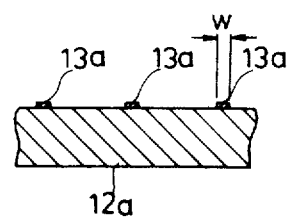
FIG. 4(b) is a sectional elevation view showing a subsequent step in the manufacturing method.

At first, a first mask film 13 of chromium or titanium, which has smaller sputter-etching rate than an underlying substrate is applied on a principal face to become the gap face of a ferromagnetic substrate 12a, for example, Mn-Zn ferrite plate, as shown in FIG. 4(a). Then by means of photolithographic etching, the thin film 13 is etched to retain stripe part 13a on the parts to become the air-gap part as shown by FIG. 4(b) and FIG. 4(b'). The width w of the stripe part is selected substantially equal to that of track.

Figure 4C:
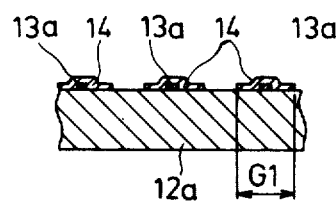
FIG. 4(c) is a sectional elevation view showing a subsequent step in the manufacturing method.

Then a second mask 14 of $SiO_2$ is formed as shown in FIG. 4(c) to cover the stripe parts 13a of the first mask 13 thereunder, by having larger width $G_1$ than the width w.

Figure 4D:
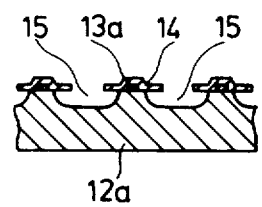
FIG. 4(d) is a sectional view showing a subsequent step in the manufacturing method.
Figure 4E:
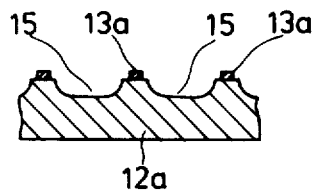
FIG. 4(e) is a sectional elevation view showing a subsequent step in the manufacturing method.

Then by means of a first electrolytic etching, the ferromagnetic substrate 12a is deeply etched to form first grooves 15, 15 . . . having 20 to 30 μm depth, as shown in FIG. 4(d) and FIG. 4(d'). In the etching, the substrate 12(a) is side-etching or under-cut laterally under the second mask 14. Then, the second mask is removed by a known removing agent such as ammonium fluoride as shown in FIG. 4(e).

Figure 4F:
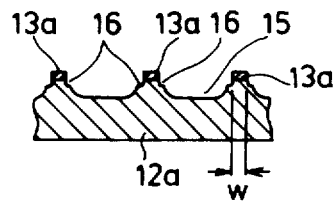
FIG. 4(f) is a sectional elevation view showing a subsequent step in the manufacturing method.

Then, a second electrolytic etching sputter etching or ion etching is carried out by using the first mask 13a as etching mask, thereby to form second smaller grooves 16, 16 . . . , as shown by FIG. 4(f). Then the first mask 13a is removed by means of, for example, cerium nitrate ammonium solution; and grooves 10', 10' . . . , positions of which are indicated by the chain lines in FIG. 4(d') for forming winding holes, are formed by known mechanical techniques. After filling the etched hollows with a reinforcing member 18 such as glass, the substrate is cut into rectangular prisms by cutting faces shown in FIG. 4(d') by dotted lines.

Figure 4G:
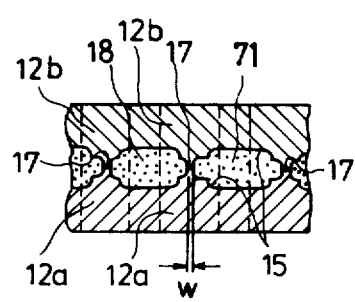
FIG. 4(g) is an elevation view showing a subsequent step in the manufacturing method.

Then, as shown by FIG. 4(g), a pair of the rectangle prism blocks 12a and 12b are bonded together using, e.g., a low melting point glass, with their principal faces, with a gap spacer 17 inbetween.

Figure 4H:
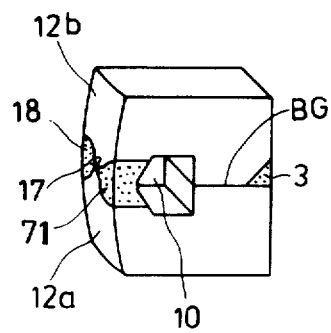
FIG. 4(h) is a perspective view showing a finished core of the magnetic recording head manufactured by the manufacturing method.

Finally by dividing the assembled body of FIG. 4(g) along the cutting faces shown by the dotted lines in FIG. 4(g), cores of the magnetic recording are completed as shown in FIG. 4(h). The sputter-etching or the techniques are very advantageous in suppressing undesirable undercuts in the second etching in the horizontal direction of FIG. 4(f) under the first mask 13a, and in obtaining high accuracy.

In the process illustrated in FIG. 4(a) to FIG. 4(h), the first etching (forming the larger and deeper recesses 15, 15 . . . as shown in FIG. 4(d)) forms the outline of the etched part, and therefore does not require very high accuracy. However, the second etching to (forming smaller and shallower recesses 16, 16 . . . , as shown in FIG. 4(f)), provides accurate track width w. The depth of such second etching is small, thereby allowing careful and accurate control of etching depth. Since both the above-mentioned first etching and second etching can be made by photolithographic etching techniques, it is possible to align the patterns of both etchings with very high accuracy and stability.

A modification of the above-mentioned example is realized by using $SiO_2$ film of a predetermined small thickness as the first mask 13a. The thin $SiO_2$ film 13 is formed by, for example, sputtering on the gap-forming face of the ferromagnetic substrate 12a, and is photolithographically etched to form a predetermined pattern as shown in FIG. 4(b'). By use of the first mask 13a of the $SiO_2$ and the second mask 14 of the photoresist film, a first electrolytic etching and a second electrolytic etching are carried out to form the larger recesses 15, 15 . . . and the smaller and high precision recesses 16, 16 . . . The first mask 13a of $SiO_2$ can be left and used as gap spacer film 17 as it is. By assembling a pair of the rectangular prism core blocks 12a and 12b, by bonding by known bonds such as low melting point glass, and then by cutting the block into pieces as shown by FIG. 4(g), magnetic head cores are finished. By such method, the magnetic cores has a gap space of twice the thickness of the first mask 13a of $SiO_2$ film.

Though the electrolytic etching, sputter-etching, ion etching or the like are usable for the above-mentioned etching, electrolytic etching is particularly advantageous in obtaining stable and high precision etching. This is because that the electrolytic etching is less dependent on crystal structure of the work, electrolytic etching can perform deep etchings with stability at a practically acceptable accuracy, and electrolytic etching can work with a high accuracy since undercut length is stable and known and hence is well controllable so that a desired high precision track width is obtainable by preliminarily calculating the known undercut length for the pattern of the photoresist mask.

Now a modified method is described wherein electrolytic etchings are employed both for the first etching (forming deeper and larger recesses 15, 15) . . . and for the second etching (forming shallower, higher accuracy recess 16). By such modification the manufacturing process can be simplified.

When electrolytic etchings are used for both etchings, a first photoresist film and a second photoresist film are used as the first etching mask 13a and the second etching mask 14 of FIGS. 4(b) to 4(f), for the second etching and the first etching, respectively. Such method is more simple than the above-mentioned examples using a thin film of chromium or titanium or glass for the first mask, since the first photoresist mask per se is now used in place of these thin film masks and hence the steps of forming such thin films by the first photoresist film are eliminated. Such a method of using two photoresist films is realized by using a combination of, for example, a first photoresist film of positive type and high resolution power and a second photoresist film of negative type and high bonding power to be durable for deep etching. By such combination of photoresist films, a magnetic recording head of highly accurate track width can be manufactured with good yield by substantially the similar process as the example of FIG. 4(a) to FIG. 4(h).

Figure 5A:
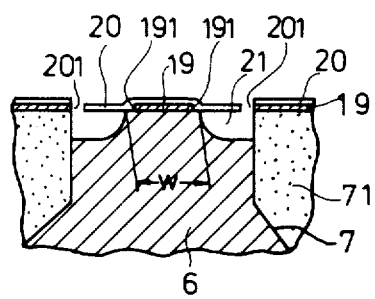
FIG. 5(a) is a sectional elevation view showing a mid-way step in another manufacturing method embodying the present invention, wherein the first part of the steps are similar to the first method shown by FIG. 3(a).
Figure 5B:
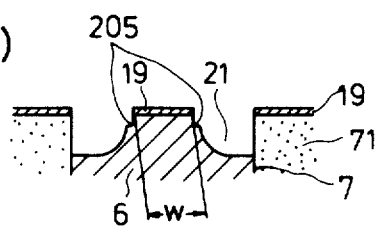
FIG. 5(b) is a sectional elevation view showing a subsequent step in the method.
Figure 5C:
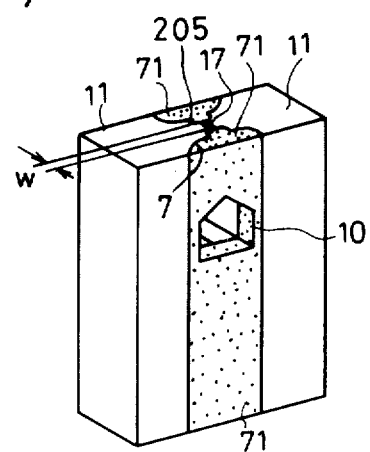
FIG. 5(c) is a perspective view showing a finished cores of the magnetic recording head manufactured by the method.

Another example is described referring to FIGS. 5(a) to 5(c). Initial steps are similar to those of FIG. 3(a), and therefore elucidated with reference to FIG. 3(a). That is, at first, parallel grooves, 7, 7 . . . are formed by mechanical techniques such as dicing or the like on a principal face 61, which is to become gap face, of a ferromagnetic substance substrate 6, such as Mn-Zn ferrite, of the size, for example, 25 mm square and 1 mm thickness. The grooves 7, 7 . . . are formed so as to hold space G inbetween which is larger than the size of the track width. For example when the track width is 20 $\mu$m, the space G between the neighboring edges of two grooves is selected 30 $\mu$m, and the depth of the grooves 7, 7 . . . are about 200 $\mu$m. Then the grooves 7, 7 . . . are filled with non-magnetic substance 71, such as glass, similar to the case shown in FIG. 3(a), and the principal face 61 is ground and polished to a mirror-smooth face. Then, a first mask 19 of chromium, shown in FIG. 5(a), for defining track width is formed on the principal face 61, having openings 191, 191 . . . for defining track width, of similar pattern to that of FIG. 3(b). The openings 191, 191 . . . are formed having gaps g inbetwen which are substantially identical to the track width.

Then, a second mask 20 of known photoresist film having wider width to cover the first mask 19 is formed thereon as shown in FIG. 5(a), having openings 201, 201 . . . with similar pattern to that of the openings 81, 81 . . . of FIG. 3(b).

Then, by means of electrolytic etching, the substrate 6 exposed through the openings 201, 201 . . . are etched, thereby forming first deeper grooves 21, 21 . . . of 20 $\mu$m depth, as shown in FIG. 5(a). The etching is made using an etchant containing phosphoric acid, sulfuric acid and glycerine at the ratio of 1:1:1, and applying a DC voltage of 8 V, and an etching rate of 1 $\mu$m/min is obtained.

Then, after removing the second etching mask 20 by a known method, a second etching is carried out by sputter-etching, using the first mask 19 of chromium film, so that a second grooves 205, 205 . . . are formed, thus retaining the accurate track width of w defined by the first mask 19, as shown by FIG. 5(b).

Thereafter, as shown by FIG. 3(d), grooves 10', 10' . . . for forming winding holes are formed by a mechanical technique such as dicing on the principal face 61. Then by cutting the ferrite substrate into oblong blocks, bonding a pair of blocks together, using, e.g. low melting point glass, and then cutting the bonded pair into pieces, a recording head shown in FIG. 5(c) is finished.

Figure 6:
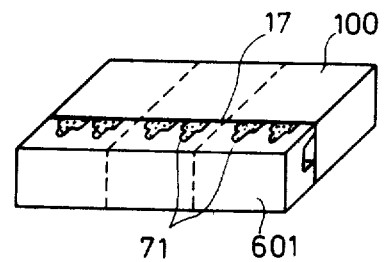
FIG. 6(a) is a perspective view showing a step in another manufacturing method embodying the present invention.
FIG. 6(b) is a perspective view showing a finished core of the magnetic recording head manufactured by the method.
Figure 6:
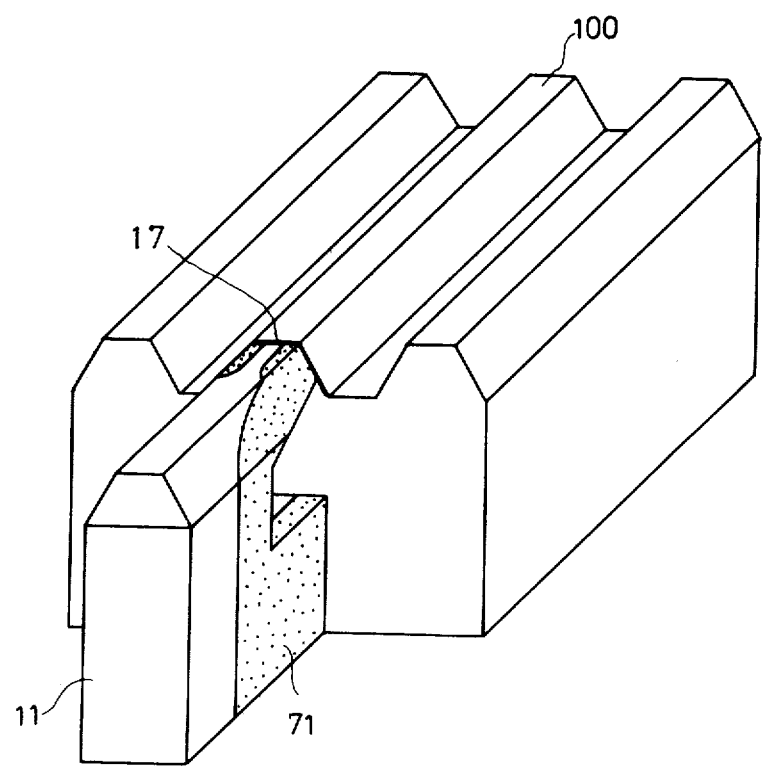

Another example is described referring to FIGS. 6(a) and 6(b). Initial steps are similar to those of FIG. 3(a), that is, at first, parallel grooves 7,7 . . . are formed by a mechanical technique such as dicing or the like, on a principal face 61 which is to become gap face, of a ferromagnetic substance 6, such as Ni-Zn ferrite, of the size, for example, 25 mm square and 1 mm thick. The grooves 7, 7 . . . are formed with gaps G inbetween which are larger than the size of the track width. For example when the track width is 20 $\mu$m, the gap G between the neighboring edges of two groove is selected 30 $\mu$m, and the depth of the grooves 7, 7 . . . are about 200 $\mu$m. Then the grooves 7,7 . . . are filled with non-magnetic substance 71 such as glass molded similar to the case shown in FIG. 3(a), and the principal face 61 is ground and polished to a mirror-smooth face.

Then, a photoresist mask 8 is formed on the principal face 61, having openings 81, 81 . . . for defining track width, as shown by FIG. 3(b). The openings 81, 81 . . . are formed in a manner to retain gap space g inbetween which is larger, by an estimated side etch width, than the track width as shown by FIG. 3(c), and in the example for the track width of 20 μm the gap space g is selected 26 μm.

Then, by means of electrolytic etching, the substrate 6 exposed through the openings 81, 81 . . . are etched, thereby forming track width defining grooves or second grooves 9, 9 . . . of 3 μm depth and side etched by 3 μm under the photoresist mask 8. The etching is made by using an etchant containing phosphoric acid, sulfuric acid and glycerine at the ratio of 1:1:1, and applying a DC voltage of 8 V, and an etching rate of 1 μm/min is obtained.

Thereafter, similar to the case of FIG. 3(d), grooves 10', 10' . . . for forming winding holes are formed, by a mechanical technique such as dicing, on principal face 61. Then the substrate is cut into oblong blocks by the cutting face as shown by dotted lines in FIG. 3(d), thereby forming oblong blocks (601) each having several pieces of half-made core.

Then, the block 601 is bonded with a gap spacer film inbetween onto a ferrite block 100 which is to become the slider of magnetic recording head, as shown by FIG. 6(a).

Then the assembled core of FIG. 6(a) is cut into individual core pieces by cutting face as shown by dotted lines in FIG. 6(a), and after carrying out necessary techniques to form grooves for the slider function.

What is claimed is:

1. A method of making magnetic recording heads having a predetermined track width associated therewith, comprising the steps of:
    forming first grooves on a face of a ferromagnetic substrate disposed substantially parallel to each other, spaced apart by a distance wider than said track width, by forming a first mask and a second mask which is broader than said first mask, covers said first mask and is removable separately from said first mask, and carrying out a first etching of said substrate by using said second mask as an etching mask;
    subsequently forming by photolithographic etching, second substantially parallel grooves having a depth shallower than that of said first grooves, disposed parallel to and connecting to said first grooves at the edges thereof, by selectively removing said second mask while retaining said first mask, and carrying out a second etching to form said second substantially parallel grooves using said first mask as an etching mask, said second grooves defining track width by the distance inbetween;
    cutting the ferromagnetic substrate into a predetermined number of units; and
    assembling a core by utilizing at least one of said units.

2. A method of making magnetic recording heads in accordance with claim 1, wherein said substrate is a plate.

3. A method of making magnetic recording heads in accordance with claim 1 which further comprises a step of filling said first grooves with non-magnetic substance, followed by grinding and polishing said face, prior to said subsequent step of photolithographic etching.

4. A method of making magnetic recording heads in accordance with claim 1, wherein said plate is of a ferrite.

5. A method of making magnetic recording heads in accordance with claim 1, wherein a gap spacer film is applied on at least the portion of said face to become a recording gap, prior to said cutting.

6. A method of making magnetic recording heads in accordance with claim 1 wherein said assembling step comprises the step of assembling two of said units with the faces thereof opposed spaced apart by a gap therebetween.

7. A method of making magnetic recording heads in accordance with claim 6, wherein said substrate is a plate.

8. A method of making magnetic recording heads in accordance with claim 6 which further comprises a step of filling said first grooves with non-magnetic substance, followed by grinding and polishing said face, prior to said subsequent step of photolithographic etching.

9. A method of making magnetic recording heads in accordance with claim 6, wherein said plate is of a ferrite.

10. A method of making magnetic recording heads in accordance with claim 6, wherein a gap spacer film is applied on at least the portion of said face to become a recording gap, prior to said cutting.

11. A method of making magnetic recording heads having a predetermined track width associated therewith, comprising the steps of:
    forming first grooves on a face of a ferromagnetic substrate disposed substantially parallel to each other, spaced apart by a distance wider than said track width;
    subsequently forming by photolithographic etching, second substantially parallel grooves having a depth shallower than that of said first grooves, disposed parallel to and connecting to said first grooves at the edges thereof,
    said photographic etching comprising the steps of
        forming a first mask and
        forming a second mask which is broader than said first mask, covers said first mask and is removable separately from said first mask,
        a first etching to form deeper second groove by using said second mask as an etching mask,
        selectively removing said second mask while retaining said first mask, and
        a second etching to form a shallower third groove using said second mask as an etching mask, said third grooves defining track width by the distance inbetween;
    cutting the ferromagnetic substrate into a predetermined number of units; and
    assembling a core by utilizing at least one of said units.

12. A method of making magnetic recording heads in accordance with claim 11, wherein said substrate is a plate.

13. A method of making magnetic recording heads in accordance with claim 11 which further comprises a step of filling said first grooves with non-magnetic substance, followed by grinding and polishing said face, prior to said subsequent step of photolithographic etching.

14. A method of making magnetic recording heads in accordance with claim 11, wherein said plate is of a ferrite.

15. A method of making magnetic recording heads in accordance with claim 11, wherein said first grooves are formed by machining.

16. A method of making magnetic recording heads in accordance with claim 11, wherein a gap spacer film is applied on at least the portion of said face to become a recording gap, prior to said cutting.

17. The method of claim 11 wherein said assembling step comprises the step of assembling two of said units with the faces thereof opposed spaced apart by a gap therebetween.

18. A method of making magnetic recording heads in accordance with claim 17, wherein said substrate is a plate.

19. A method of making magnetic recording heads in accordance with claim 17 which further comprises a step of filling said first grooves with non-magnetic substance, followed by grinding and polishing said face, prior to said subsequent step of photolithographic etching.

20. A method of making magnetic recording heads in accordance with claim 17, wherein said plate is of a ferrite.

21. A method of making magnetic recording heads in accordance with claim 18, wherein said first grooves are formed by machining.

22. A method of making magnetic recording heads in accordance with claim 17, wherein a gap spacer film is applied on at least the portion of said face to become a recording gap, prior to said cutting.

* * * * *